Feb. 6, 1968       MORIYUKI TAKAGI       3,367,239
FLUID REDUCERS

Filed July 26, 1965                3 Sheets-Sheet 1

Moriyuki Takagi
INVENTOR.

BY George B. Oujeirot
Attorney

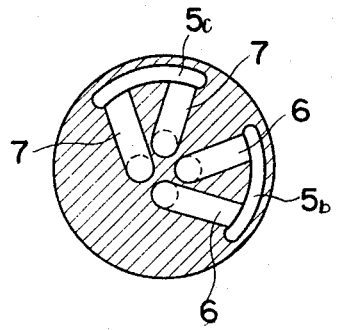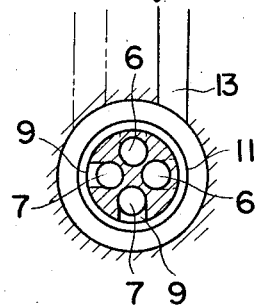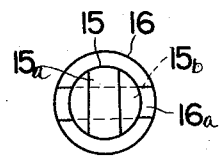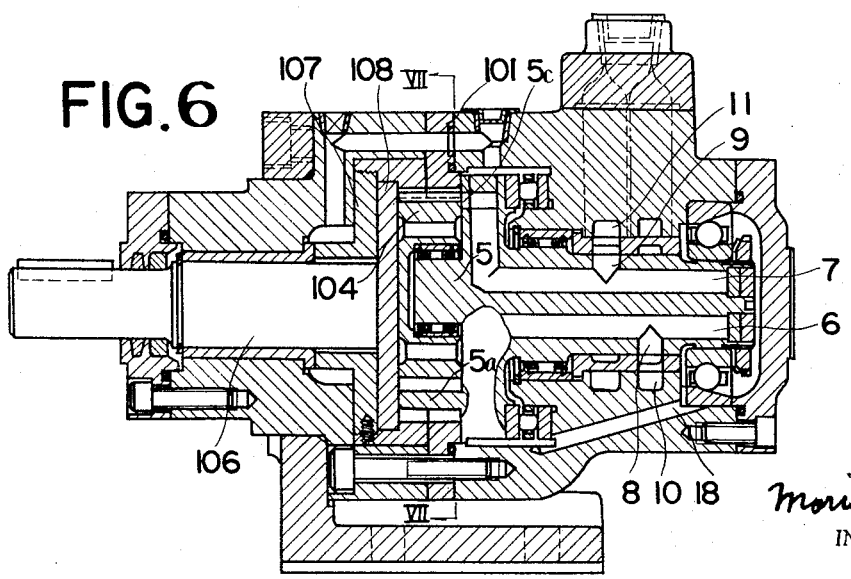

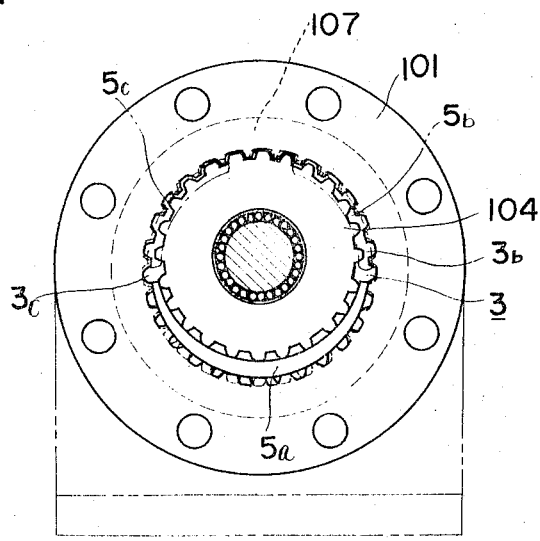

United States Patent Office 3,367,239
Patented Feb. 6, 1968

3,367,239
FLUID REDUCERS
Moriyuki Takagi, 31 Katayama, Shinza-machi,
Kita Adachi-gun, Saitama-ken, Japan
Filed July 26, 1965, Ser. No. 474,706
Claims priority, application Japan, July 28, 1964,
39/42,506
2 Claims. (Cl. 91—56)

ABSTRACT OF THE DISCLOSURE

In a fluid reducer drive arrangement an internal involute gear and a meshing involute pinion are provided in engagement such as to form two sections in the fluid chamber the rotary member being driven by the fluid flow from one section to the other.

---

This invention relates to a fluid reducer, and more particularly to a fluid reducer adapted to drive a gear mechanism by a flow of pressurized fluid so as to convert the power of the fluid into mechanical rotary output.

Prior fluid devices heretofore used are the so-called fluid motors which are characterized by realtively high output speed and low torque. With this fluid device, it has been necessary to couple it to a separate speed reducer in order to provide an output of high torque at a lower speed.

This invention contemplates using a gear system essentially comprising an involute gear consisting of only one stationary internal gear mounted on a frame and a planet pinion so as to provide a novel fluid reducer which can directly provide a low rotating speed and a high torque without utilizing any speed reducer as in the prior art.

According to this invention there is provided a fluid reducer comprising a stationary internal gear mounted on a frame, which defines a fluid chamber, a planet pinion meshing with said internal gear, a rotary member journaled concentrically with said internal gear to journal said planet pinion, said internal and planet gears cooperating to divide said fluid chamber into two sections and an output shaft journaled concentrically with said internal gear to be driven by the rotation of said planet pinion so as to cause the rotary member to rotate by the flow of liquid through the planet pinion from one section to the other section of the fluid chamber.

In operation, the fluid is introduced in one section of the fluid chamber, then introduced into the other section to cause the planet pinion to revolve with respect to the internal gear according to the theory of a gear motor and finally discharged from the second section to drive the rotary member. Assuming now that $Z_1$ represents the number of teeth of the planet pinion, and $Z_2$ the number of teeth of the gear, then one revolution of the planet pinion (one rotation of the rotary member) will cause the planet pinion to rotate by $$\frac{Z_2-Z_1}{Z_1}$$

Thus the gear ratio of two gears are selected to be 8:9, and the planet pinion will make ⅑ revolution. By coupling the rotation of the planet pinion to the output shaft the output shaft can be rotated at a fairly reduced speed to provide a high torque without utilizing any independent speed reducer.

In the fluid reducer constructed according to this invention a partition is provided for the rotary member at a point opposite to the contact point between intermeshing internal gear and planet pinion, said partition being arranged to be slidable between tooth tops of said gear and pinion. Alternatively, the tooth tops of the gear and pinion are constructed so as to partition the fluid chamber. In this construction, as the point of contact rotates it is necessary to provide some arrangement that can assure rotation of the left and right fluid chambers as the planet pinion revolves. To this end, the rotary member is so constructed that it will rotate at the same speed as that of the revolution of the planet pinion and that to constantly introduce the fluid into one section of the fluid chamber and discharge the fluid from the other section, thus providing high torque output at low speed. This invention utilizes an involute gear because it is most suitable and practicable and other gears are not suitable.

As a modified form, this invention provides a fluid reducer comprising a stationary internal gear mounted on a frame to define a liquid chamber, a planet pinion meshing with said internal gear, a rotary member concentrically journaled by said internal gear to journal said planet pinion, said internal gear and said planet pinion cooperating to partition said fluid chamber into two sections, and an internal gear for driving an output shaft, said last mentioned internal gear being concentrically journaled by said first mentioned internal gear and being provided with a different number of teeth to mesh with said planet pinion so as to rotate the rotary member while the fluid is caused to flow through said planet pinion from one section to the other of said fluid chamber.

In operation, fluid is introduced into one of the sections of the fluid chamber to cause the planet pinion to rotate with respect to the internal gear according to the theory of the geared motor. Then, the fluid is introduced into the other section through the planet pinion and thence discharged from the other section so as to rotate the rotary member. If it is assumed now that $Z_2$ denotes the number of teeth of the internal gear and $Z_3$ that of the teeth of the internal gear coupled to the output gear then the number of revolutions of said internal gear coupled to the output shaft per one revolution of the planet pinion (corresponding to one revolution of the rotary member) will be expressed by $$\frac{Z_3-Z_2}{Z_3}$$

For example, if the numbers of teeth of both gears are equal to 29 and 30 respectively, the internal gear coupled to the output gear will rotate by ⅟₃₀ rotation per one revolution of the planet pinion. Thus, according to this invention the output shaft has an inherent low speed.

This invention can be more fully understood from the following description taken with the accompanying drawings in which:

FIG. 3 is a cross-sectional view of the fluid reducer, taken along a line III—III of FIG. 1;

FIG. 4 shows a cross-section along a line IV—IV in FIG. 1;

FIG. 5 shows a cross-section taken along a line V—V of FIG. 1;

FIG. 6 shows a longitudinal sectional view of a portion of modified fluid reducer; and FIG. 7 shows a cross-section taken along a line VII—VII of FIG. 6.

Figure 1:
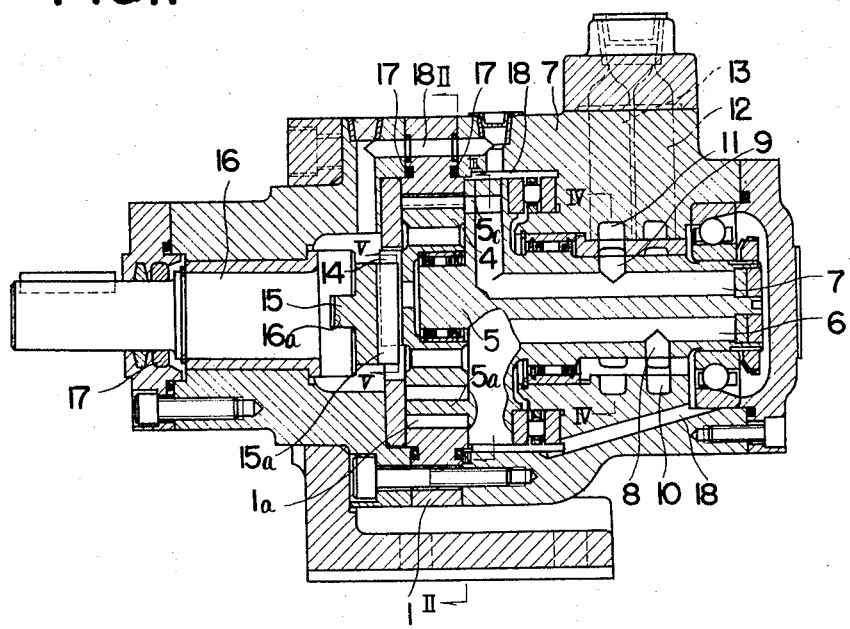
FIG. 1 shows a longitudinal sectional view of one example of a fluid reducer constructed in accordance with this invention taken along a line I—I of FIG. 2.
Figure 2:
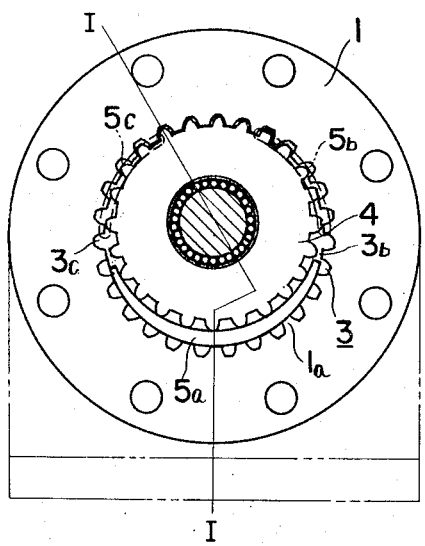
FIG. 2 is a cross-sectional view of the fluid reducer taken along a line II—II of FIG. 1.

Referring now to FIGS. 1 to 5 of the accompanying drawings there is illustrated a first embodiment of this invention which comprises a stationary internal gear 1 secured to a frame 2 and is provided with a fluid chamber 3 on its inner side. Meshing with the internal gear 1 is a planet pinion 4, the center thereof being eccentrically journaled by a rotary member 5 which is journaled by the frame 2 in concentric relation with respect to the internal gear 1. The rotary member 5 is provided with an integral arcuate partition 5a which is disposed in the fluid chamber 3 between the gear 1 and the pinion 4. This partition 5a is positioned on the side opposite to the side on which the planet pinion 4 is meshing with the internal gear 1. The partition 5a is maintained in sliding contact with the tooth tops 1a and 4a of said gear 1 and pinion 4 to divide the interior of the fluid chamber into two sections 3a and 3b. The rotary member 5 is provided with arcuate fluid openings 5b and 5c which are located near the periphery thereof and communicate with said sections 3a and 3b respectively, and fluid conduits 6 and 7 in its journal shaft to communicate with said fluid openings 5b and 5c respectively. As best shown in FIG. 1, fluid conduits 6 and 7 are provided with an inlet port 8 and an outlet port 9 respectively which are spaced axially of the rotary member 5 and annular openings 10 and 11 are provided for the frame 2 to always establish communications with the respective ports 8 and 9. These openings 10 and 11 are respectively connected to an inlet conduit 12 and discharge conduit 13. An output shaft 16 is journalled in the frame 2 in concentric relation with the internal gear 1 and is coupled to the planet pinion 4 through an Oldham's coupling 15. More specifically, the end surfaces of the planet pinion 4 and the output shaft 16 are respectively provided with radial grooves 14 and 16a and orthogonal ribs 15a and 15b adapted to slidably fit in the grooves 14 and 16α respectively. Suitable packings 17 are provided to prevent the fluid from leaking and an oil conduit 18 is provided to supply lubricant to rotary elements.

In operation, a suitable fluid, such as pressurized oi' is introduced into the inlet conduit 12 and then to the section 3a via the opening 10, inlet port 8, conduit 6 and fluid opening 5b. Due to its pressure, the oil introduced in the section 3a serves to rotate the planet pinion 4 as well as rotary member 5 with respect to the internal gear 1. As the rotary member rotates the planet pinion revolves so as to force the oil into the section 3b through intermeshing portions of the planet pinion and the internal gear according to the theory of the gear pump. The oil supplied to the section 3b will discharge via the fluid opening 5c, conduit 7, outlet port 9, annular opening 11 and the discharge conduit 13. In this arrangement there is a following relation between the rotation and revolution (or rotation of the rotary member) of the planet pinion 4. If it is assumed that the number of teeth of the planet pinion 4 $Z_1=24$ and that the number of teeth of the internal gear $Z_2=27$, then the number of rotations per one revolution is given by the following equation $$\frac{Z_1-Z_2}{Z_1}=\frac{24-27}{24}=-\frac{1}{8}$$

Thus, by transmitting the rotation to the output shaft 16 as the torque an inherently low speed can be obtained without utilizing any speed reducing mechanism as in the conventional device. In transmitting the torque to the output shaft, it will be noticed that radial movements of the pinion 4 are absorbed by the slidable engagement between the grooves 14, 16a and ribs 15a, 15b.

In a modified fluid reducer shown in FIGS. 6 and 7 an additional internal gear coupled with an output shaft is provided to mesh with a planet pinion so as to derive output power from the output shaft. More particularly, in this embodiment, a fluid chamber 103 is defined by an internal gear 101 identical to that of the first embodiment and an internal gear 107 coupled to an output shaft 106, said internal gear 107 having a number of teeth different from that of the internal gear 101 by a small number, say for example, one. Thus for example, if the number of teeth $Z_2$ of the gear 101 is selected to be equal to 27, the number of teeth $Z_3$ of the gear 107 is selected to be equal to 28, as has been pointed out above. The gear mechanism comprising a common pinion and two internal gears meshing therewith is known in the art as a shift gear. Thus a common planet pinion 104 having a number of teeth $Z_1=24$ is disposed to mesh with both internal gears 101 and 107 and journaled by a rotary member 5. The internal gear 107 is keyed to the output shaft 106 and a plate 108 adapted to seal the fluid chamber 103 is interposed between the end of the output shaft 106 and the end surface of the planet pinion.

With this arrangement, if the number of teeth of the internal gear $Z_2=27$ and the number of teeth of the internal gear 107 coupled to the output shaft $Z_3=28$, then the ratio between the revolution of the planet pinion 104 (or a rotation of the rotary member 5) to the rotation of the internal gear 107 will be greatly reduced as represented by $$\frac{Z_2-Z_3}{Z_3}=\frac{27-28}{28}=-\frac{1}{28}$$

In other words, as the planet pinion 104 makes one revolution with respect to the internal gear the internal gear 107 coupled to the output shaft will be moved with respect to the planet pinion 104 by one tooth in the direction opposite to the direction of revolution or in the direction of revolution of the planet pinion 104.

Having thus described the invention, it is obvious that numerous modifications and departures may be made by those skilled in the art; thus, the invention is to be construed as limited only by the spirit and scope of the appended claims.

What is claimed is:

1. A fluid reducer comprising a stationary internal involute gear mounted on a frame and defining a fluid chamber, a planet involute pinion meshing with said internal gear, a rotary member concentrically journaled with the internal gear and journaled with the planet pinion at an axis eccentrically aligned to the axis of the internal gear, a partition integrally formed with a side of the rotary member opposite to that where said internal gear and said planet gear mesh each other, and slidable between teeth tops of said gear and pinion thus dividing said fluid chamber into two sections, said rotary member being driven by the flow of a fluid between said planet pinion and said partition from one of the sections of said fluid chamber to the other section, an output shaft coaxially journaled with said internal gear and driven by the rotation of said planet pinion, and an inlet conduit and a discharge conduit formed in the rotary member and respectively communicating with one and the other of said sections.

2. The fluid reducer according to claim 1 wherein an additional internal involute gear journaled concentrically with said first mentioned internal gear is provided, said additional gear having a slightly different number of teeth than said first mentioned gear and being of a same pitch circle as that of said first mentioned gear, said additional internal gear meshing with said planet pinion, said output shaft being coaxially journaled with said additional internal gear and driven by the rotation thereof.

(References on following page)

References Cited

UNITED STATES PATENTS

| | | | |
|---|---|---|---|
| 1,389,189 | 8/1921 | Feuerheerd | 103—130 |
| 1,682,567 | 8/1928 | Hill | 230—141 |
| 1,802,887 | 4/1931 | Feyers | 230—145 |
| 2,132,812 | 10/1938 | Wahlmark | 103—130 X |
| 2,240,874 | 5/1941 | Thomas | 91—56 |
| 2,787,963 | 4/1957 | Dolan | 103—126 |
| 2,871,831 | 2/1957 | Patin | 91—56 X |
| 2,905,094 | 9/1959 | Gerteis | 103—126 X |
| 3,087,436 | 4/1963 | Dettlof | 103—130 |
| 3,270,681 | 9/1966 | Charlson | 103—130 |
| 3,288,078 | 11/1966 | Monroe | 103—130 |
| 3,289,542 | 12/1966 | Fikse | 91—56 |
| 3,289,601 | 12/1966 | Compton | 103—130 |

MARTIN P. SCHWADRON, *Primary Examiner.*

G. N. BAUM, *Assistant Examiner.*